(12) United States Patent
Chung-Ting

(10) Patent No.: US 6,838,644 B1
(45) Date of Patent: Jan. 4, 2005

(54) HOUSEHOLD SECTIONAL OVEN AND WARMER COOKING APPARATUS

(76) Inventor: Tseng Chung-Ting, P.O. Box 24-108, Taipei (TW)

( * ) Notice: Subject to any disclaimer, the term of this patent is extended or adjusted under 35 U.S.C. 154(b) by 0 days.

(21) Appl. No.: 10/800,800

(22) Filed: Mar. 16, 2004

(51) Int. Cl.$^7$ .......................... A47J 37/00; A47J 37/06; A47J 39/00
(52) U.S. Cl. ...................... 219/393; 219/385; 219/386; 219/392; 99/441
(58) Field of Search ............................... 219/385, 386, 219/392, 393; 99/441

(56) References Cited

U.S. PATENT DOCUMENTS

| | | | | |
|---|---|---|---|---|
| 2,044,615 A | * | 6/1936 | Kennedy | 99/441 |
| 4,332,189 A | * | 6/1982 | Stuck | 99/441 |
| 4,516,485 A | * | 5/1985 | Miller | 99/441 |
| 6,393,971 B1 | * | 5/2002 | Hunot et al. | 99/441 |
| 6,686,563 B1 | * | 2/2004 | Poland et al. | 219/385 |

* cited by examiner

Primary Examiner—Joseph Pelham

(57) ABSTRACT

The present invention discloses a household sectional oven and warmer cooking apparatus, which comprises an electric heating device therein for controlling the heating temperature and time of an oven by a switch control, an opening disposed at the top of the oven, a meat grilling pan having a larger depth and mounted around the periphery of the opening, a hotdog broiler disposed above the meat grilling pan and comprising a plurality of parallel cylinders at an appropriate distance apart from each other, a bread tray with a smaller depth disposed above the hotdog broiler and having a plurality of through holes disposed at the bottom of the bread tray, and a lid for covering the whole oven and warmer apparatus and keeping it warm. With a quick, convenient, and flexible installation of a meat grilling pan, a hotdog broiler, and a bread tray onto the oven, the electric heating device and each cooking food item are kept in an appropriate distance with partitions to avoid the food from being burned and achieve the purpose of heating and warming the food appropriately. The overall structure is simple, low-cost, and easy-to-clean, which constitutes an economic convenient household cooking apparatus.

2 Claims, 3 Drawing Sheets

HOUSEHOLD SECTIONAL OVEN AND WARMER COOKING APPARATUS

FIELD OF THE INVENTION

The present invention relates to a cooking apparatus, more particularly to a household sectional oven and warmer cooking apparatus. The present invention aims at the traditional way of cooking hotdogs by putting the hotdog meat in a bun. The traditional way generally has the problems of requiring several cooking apparatuses to cook or warm the hotdog and the bun, and keeping these warm at the same time. To overcome such shortcomings, the present invention discloses a cooking apparatus comprising an electric heating device therein for controlling the heating temperature and time of an oven by a switch control, an opening disposed at the top of the oven, a meat grilling pan having a larger depth and mounted around the periphery of the opening, a hotdog broiler disposed above the meat grilling pan and comprising a plurality of parallel cylinders at an appropriate distance apart from each other, a bread tray with a smaller depth disposed above the hotdog broiler and having a plurality of through holes disposed at the bottom of the bread tray, and a lid for covering the whole oven and warmer apparatus and keeping it warm. With a quick, convenient, and flexible installation of a meat grilling pan, a hotdog broiler, and a bread tray onto the oven, the electric heating device and each cooking food item are kept in an appropriate distance with partitions to avoid the food from being burned and achieve the purpose of heating and warming the food appropriately. The overall structure is simple, low-cost, and easy-to-clean, which constitutes an economic convenient household cooking apparatus.

BACKGROUND OF THE INVENTION

Among the sandwiches made by putting meat in a bun, hotdog is a common favorite fast food to most people, particularly children. In addition, hotdog stands are available everywhere such as a shopping mall, a park, a cinema, or even on the road. It makes hotdogs a very common available fast food. However, the general household cooking apparatus is insufficient to make good hotdogs. To make it convenient, a pan or an oven is used to heat the hotdog directly, but the required heat and the heating method of the hotdog, the bun, and the meat are different. Therefore, heating these items directly by a pan cannot give a good result, since the temperature of the heat is not even and thus the hotdog or the bun may get burned. If several cooking apparatuses are used for cooking and warning, the user may act with confusion. If these items are cooked at different time, it will have the issue of keeping the cooked food warm. The traditional way of cooking hotdogs demands further studies for an improvement.

SUMMARY OF THE INVENTION

In view of the shortcomings of the conventional holders, the inventor of this invention based on years of experience on the production and design of household kitchen wares to conduct researches and experiments to overcome the foregoing shortcomings and look for an improved method, and finally invented the household sectional oven and warmer cooking apparatus in accordance with the present invention.

The primary objective of the present invention is to provide a household sectional oven and warmer cooking apparatus, which comprises an electric heating device therein for controlling the heating temperature and time of an oven by a switch control, an opening disposed at the top of the oven, a meat grilling pan having a larger depth and mounted around the periphery of the opening, a hotdog broiler disposed above the meat grilling pan and comprising a plurality of parallel cylinders at an appropriate distance apart from each other, a bread tray with a smaller depth disposed above the hotdog broiler and having a plurality of through holes disposed at the bottom of the bread tray, and a lid for covering the whole oven and warmer apparatus and keeping it warm. With a quick, convenient, and flexible installation of a meat grilling pan, a hotdog broiler, and a bread tray onto the oven, the electric heating device and each cooking food item are kept in an appropriate distance with partitions to avoid the food from being burned and achieve the purpose of heating and warming the food appropriately.

The secondary objective of the present invention is to provide a household sectional oven and warmer cooking apparatus, which comprises an oven with an electric heating device, a meat grilling pan disposed above the oven, a hotdog broiler disposed above the meat grilling pan, a bread tray disposed above the hotdog broiler, and the overall structure is simple, low-cost, and easy-to-clean, which constitutes an economic convenient household cooking apparatus.

DETAILED DESCRIPTION OF THE PREFERRED EMBODIMENTS

Figure 1:
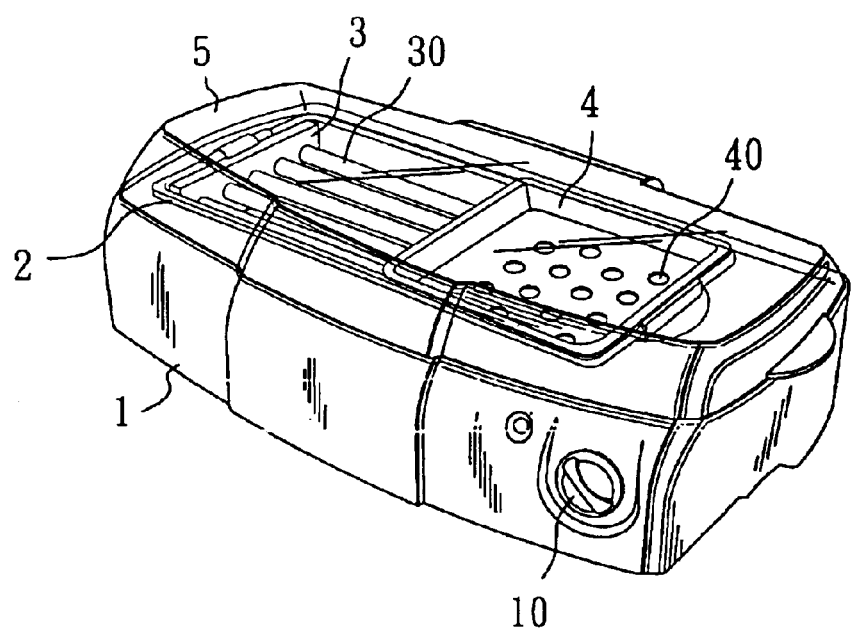
FIG. 1 is a perspective view of the oven and warmer apparatus according to a first preferred embodiment of the present invention
Figure 2:
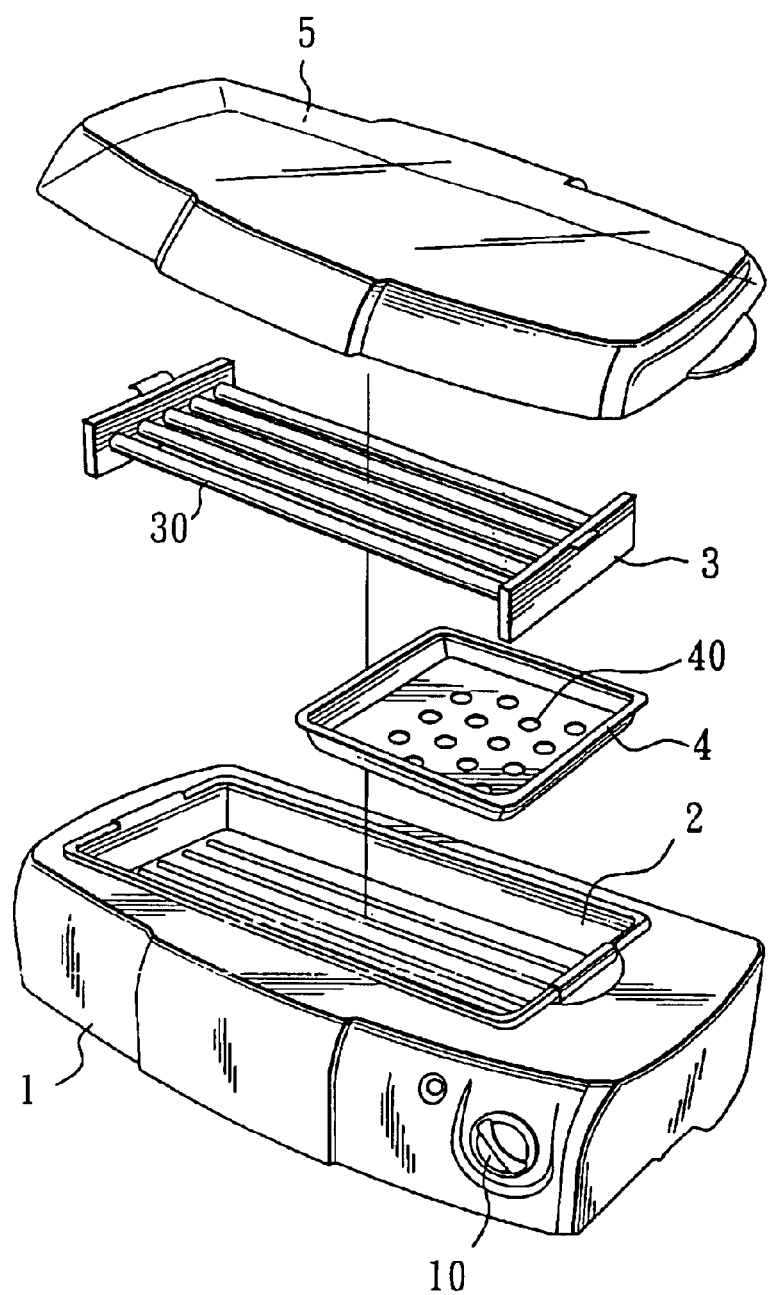
FIG. 2 is an exploded view of the oven and warmer apparatus according to a first preferred embodiment of the present invention.
Figure 3:
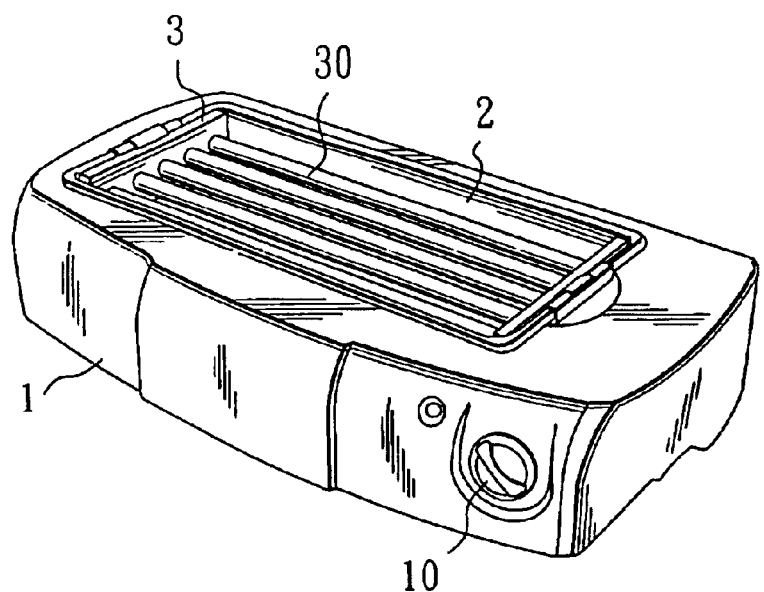
FIG. 3 is a perspective view of the oven and warmer apparatus according to a second preferred embodiment of the present invention.
Figure 4:
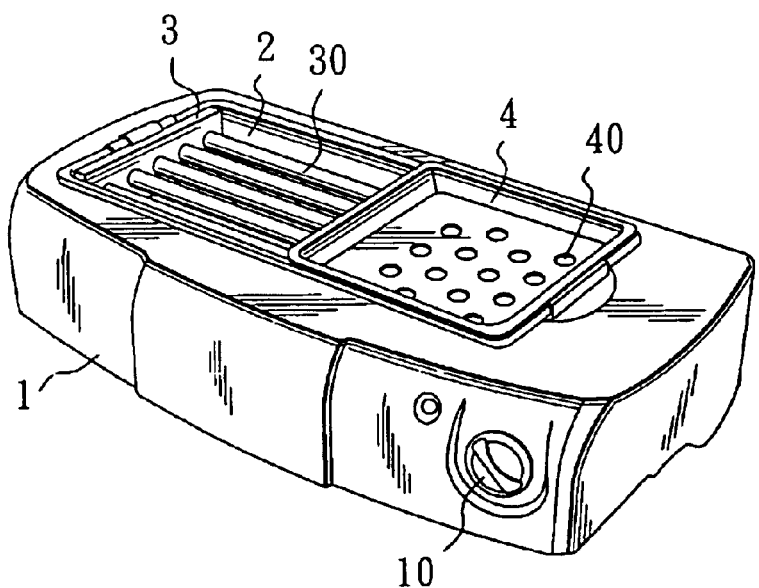
FIG. 4 is a perspective view of the oven and warmer apparatus according to a third preferred embodiment of the present invention.

To make it easier for our examiner to understand the objective of the invention, its structure, innovative features, and performance, we use a preferred embodiment together with the attached drawings for the detailed description of the invention.

Please refer to the figures for the present invention. The present invention comprises an oven 1, a meat grilling pan 2, a hotdog broiler 3, a bread tray 4, and a lid 5; wherein the oven 1 comprises an electric heating device therein for controlling the heating temperature and time of the oven by a switch control 10, an opening disposed at the top of the oven 1, a meat grilling pan 2 having a larger depth and mounted around the periphery of the opening, a hotdog broiler 3 disposed above the meat grilling pan 2 and comprising a plurality of parallel cylinders 30 at an appropriate distance apart from each other, a bread tray 4 with a smaller depth disposed above the hotdog broiler 3 and having a plurality of through holes 40 disposed at the bottom of the bread tray 4, and a lid 5 for covering the whole oven and warmer apparatus and keeping it warm.

In the practical use of the cooking apparatus of the present invention, users can flexibly install the meat grilling pan 2, the hotdog broiler 3, and the bread tray 4 onto the oven 1 according to the type of their desired food items to cope with the different required heat and heating methods. Meat is put into the meat grilling pan 2 closest to the electric heating device for its grilling, and hotdog is put into the hotdog broiler disposed at an appropriate distance from the meat grilling pan 2 for its broiling, and buns are put in the bread tray farthest away from the electric heating device for its heating, such that the electric heating device and each cooking food item are kept in appropriate distances and partitions to meet the different requirements for the required heat energy and heating method and avoid the food from being burned. A switch 10 adjusts and controls the heating temperature and time, so that different food items can be put into the cooking apparatus at the same time for heating and warming. The user no longer has the problems of acting with confusions or keeping different items warm at the same time. Further, the bread tray 4 can be used as a regular tray when it is removed from the oven 1. The overall structure is simple, and the manufacturing cost is low, and each module can be removed from the oven 1 for cleaning, which constitutes an economic convenient household cooking apparatus.

In summation of the above description, the present invention enhances the performance of the conventional structure by cooking different food items in the same cooking apparatus at the same time to avoid the food from getting burned or becoming cold and providing a simple overall structure, a low cost for its manufacture, and a simple way for its cleaning, and further complies with the patent application requirements. The present invention is thus submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A household sectional oven and warmer cooking appartus, comprising an oven, a meat grilling pan, a hotdog broiler, a bread tray, and a lid; wherein said oven further comprising an electric heating device therein for adjusting and controlling heating temperature and time; an opening disposed at the top of said oven, and said meat grilling pan with a larger depth being mounted around the periphery of said opening; said hotdog broiler being disposed above said meat grilling pan and comprised of a plurality of parallel cylinders with an appropriate distance apart from each other; said bread tray with a smaller depth being disposed above said hotdog broiler; and a lid for covering said oven and warmer cooking apparatus and keeping said oven and warmer cooking apparatus warm.

2. The household sectional oven and warmer cooking apparatus of claim 1, wherein said bread tray has a plurality of through holes at its bottom.

* * * * *